(12) United States Patent
Hobson et al.

(10) Patent No.: US 9,730,340 B1
(45) Date of Patent: Aug. 8, 2017

(54) ELECTRONIC DEVICE WITH ARRAY OF ROTATIONALLY MOUNTED COMPONENTS

(71) Applicant: Apple Inc., Cupertino, CA (US)

(72) Inventors: Phillip Michael Hobson, Menlo Park, CA (US); Nathan P. Bosscher, Campbell, CA (US); John J. Baker, Cupertino, CA (US); Craig M. Stanley, Campbell, CA (US); Brad G. Boozer, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 125 days.

(21) Appl. No.: 14/720,502

(22) Filed: May 22, 2015

Related U.S. Application Data

(60) Provisional application No. 62/057,817, filed on Sep. 30, 2014.

(51) Int. Cl.
*H05K 5/02* (2006.01)
*G06F 1/16* (2006.01)

(52) U.S. Cl.
CPC .............. *H05K 5/02* (2013.01); *H05K 5/0247* (2013.01)

(58) Field of Classification Search
None
See application file for complete search history.

(56) References Cited

U.S. PATENT DOCUMENTS

| | | | |
|---|---|---|---|
| 5,239,130 A | 8/1993 | Brasse | |
| 5,904,590 A * | 5/1999 | Fekete | G06K 19/077 361/732 |
| 5,984,494 A * | 11/1999 | Chapman | B64D 47/04 362/240 |
| 6,384,407 B1 * | 5/2002 | Frank | G01J 5/041 250/221 |
| 6,514,569 B1 * | 2/2003 | Crouch | B05C 5/0208 222/134 |
| 6,544,069 B1 * | 4/2003 | Enriquez, Sr. | H01R 35/04 439/534 |
| 6,834,895 B2 | 12/2004 | Lin | |
| 6,973,681 B2 * | 12/2005 | Ayeni | A61H 33/60 4/541.6 |
| 7,210,961 B2 * | 5/2007 | Berg | G01D 11/245 439/403 |

(Continued)

FOREIGN PATENT DOCUMENTS

GB 1518056 7/1978
JP 201108820 6/2011

*Primary Examiner* — Xanthia C Cunningham
(74) *Attorney, Agent, or Firm* — Kilpatrick Townsend & Stockton LLP

(57) ABSTRACT

An array of electrical components may be mounted in openings in an electronic device housing. Gaskets may be used to seal the electrical components to a housing wall. The housing wall may be planar or may have a cylindrical shape or other curved shape. The electrical components may be mounted to the housing wall by rotating the electrical components so that portions of the components bear against an inner surface of the housing wall. Component mounting structures that receive the electrical components may be used in mounting the electrical components. Component cover structures with openings may overlap the components. Engagement features may help prevent relative rotational motion between the electrical components and the housing wall of the electronic device.

29 Claims, 23 Drawing Sheets

(56) References Cited

U.S. PATENT DOCUMENTS

| | | | | |
|---|---|---|---|---|
| 7,242,587 B2* | 7/2007 | Bohlin | ............... | G02B 6/4292 |
| | | | | 361/728 |
| 7,304,864 B2* | 12/2007 | Chen | ............... | H04M 1/0283 |
| | | | | 361/815 |
| 8,042,962 B2* | 10/2011 | Fuentes | ............... | F21V 33/004 |
| | | | | 362/234 |
| 8,407,938 B2* | 4/2013 | Faria | ............... | E05D 15/00 |
| | | | | 220/254.2 |
| 8,415,570 B2* | 4/2013 | Dabov | ............... | G06F 1/1656 |
| | | | | 174/520 |
| 2005/0194796 A1* | 9/2005 | Powell | ............... | F02M 37/103 |
| | | | | 292/256 |
| 2007/0049357 A1* | 3/2007 | Daimon | ............... | H04M 1/03 |
| | | | | 455/575.1 |
| 2009/0093175 A1* | 4/2009 | Fujino | ............... | B63B 35/731 |
| | | | | 440/38 |
| 2011/0199485 A1* | 8/2011 | Nakamura | ............... | G02B 13/001 |
| | | | | 348/148 |
| 2013/0163170 A1* | 6/2013 | Chen | ............... | G03B 29/00 |
| | | | | 361/679.4 |
| 2014/0011386 A1* | 1/2014 | Braunlich | ............... | H01R 13/6456 |
| | | | | 439/350 |
| 2014/0063753 A1* | 3/2014 | Chino | ............... | H05K 9/00 |
| | | | | 361/729 |
| 2015/0334863 A1* | 11/2015 | Beer | ............... | H05K 5/0213 |
| | | | | 220/745 |
| 2015/0371794 A1* | 12/2015 | Duenninger | ............... | B60K 35/00 |
| | | | | 345/175 |

* cited by examiner

ELECTRONIC DEVICE WITH ARRAY OF ROTATIONALLY MOUNTED COMPONENTS

This application claims the benefit of provisional patent application No. 62/057,817, filed Sep. 30, 2014, which is hereby incorporated by reference herein in its entirety.

BACKGROUND

This relates generally to electronic devices, and more particularly, to electronic devices with electronic components mounted to device housings.

Electronic devices include electronic components. Some components such as integrated circuits and batteries are mounted within interior portions of electronic device housings. Other components are mounted on the exteriors of housings. For example, components that emit or receive light or sound are often mounted in exposed locations on housings to facilitate proper operation of the components in supplying output and receiving input.

In some device designs, it may be desirable to mount multiple components in an array. For example, some electronic components benefit from operation as a coordinated group. It may be helpful in such arrangements to mount components in close proximity to each other. If care is not taken, components may be damaged during installation, damage may be created to the housing to which the components are being mounted, components may be difficult to repair when faults are detected, or components may consume more space within a device than desired.

It would be desirable to be able to address these challenges with a mounting scheme that is suitable for use when mounting components in a variety of housings.

SUMMARY

An electronic device may have a housing wall. An array of electrical components may be mounted in a corresponding array of openings in the housing wall. The components may be audio components, light-based components, sensors, or other electrical components. Gaskets may be used to seal the electrical components to the housing wall.

The housing wall may be planar or may be curved. Curved housing walls may have cylindrical shapes to form cylindrical housings. The array of openings in the housing may cover some or all of the surface of the cylindrical housing wall. Each electrical component may have a connector that is coupled to a signal path in the electrical device The electrical components may be mounted to the housing wall using rotational motion in which each electrical component is rotated about a rotational axis. With this type of configuration, the electrical components may be provided with threads that engage mating threads on a component mounting structure or the electrical components may also have protrusions or other features that engage the inner surface of the housing wall as the electrical components are rotated. Each electrical component may, for example, be rotated by a quarter turn to mount the component within a housing opening as the protrusions or other features press against the inner housing wall surface.

Component mounting structures that receive the electrical components may be used in attaching the electrical components to the housing. Component cover structures with openings may overlap the components. Engagement features may help prevent relative rotational motion between the electrical components and the housing wall of the electronic device.

DETAILED DESCRIPTION

Electronic devices may include components. The components may be light-based components, audio components, sensors, or other electrical components. The components may be mounted within the interior of an electronic device and/or may be mounted on the exterior of an electronic device. Configurations in which electrical components are exposed on the exterior of a housing may facilitate signal input and output operations using the components (e.g., input and output operations involving light signals, acoustic signals, temperature information, etc.). Accordingly, configurations in which components are mounted within openings in housing surfaces are sometimes described herein as an example.

In some devices, it may be desirable to mount multiple components in proximity to each other. For example, optical components may be mounted in proximity to each other to form a display with an array of pixels or other light output device (e.g., a light-based status indicator), speakers may be mounted in an array to form a phased speaker array or to provide enhanced output levels, microphones may be mounted in an array to gather audio information from multiple directions, proximity sensors may be mounted in an array to create a touch or motion input device that can capture input from a user's hand or other external object, and other sensors and input-output components may be mounted in arrays to enhance the ability of an electronic device to gather input and provide output.

Multiple components may be mounted adjacent to one another in a regular array having one or more rows and one or more columns of electrical components. Components may also be organized in a less regular fashion such as a pseudorandom pattern on the surface of a device housing.

Illustrative electronic devices that may be provided with components are shown in FIGS. 1, 2, 3, 4, and 5.

Figure 1:
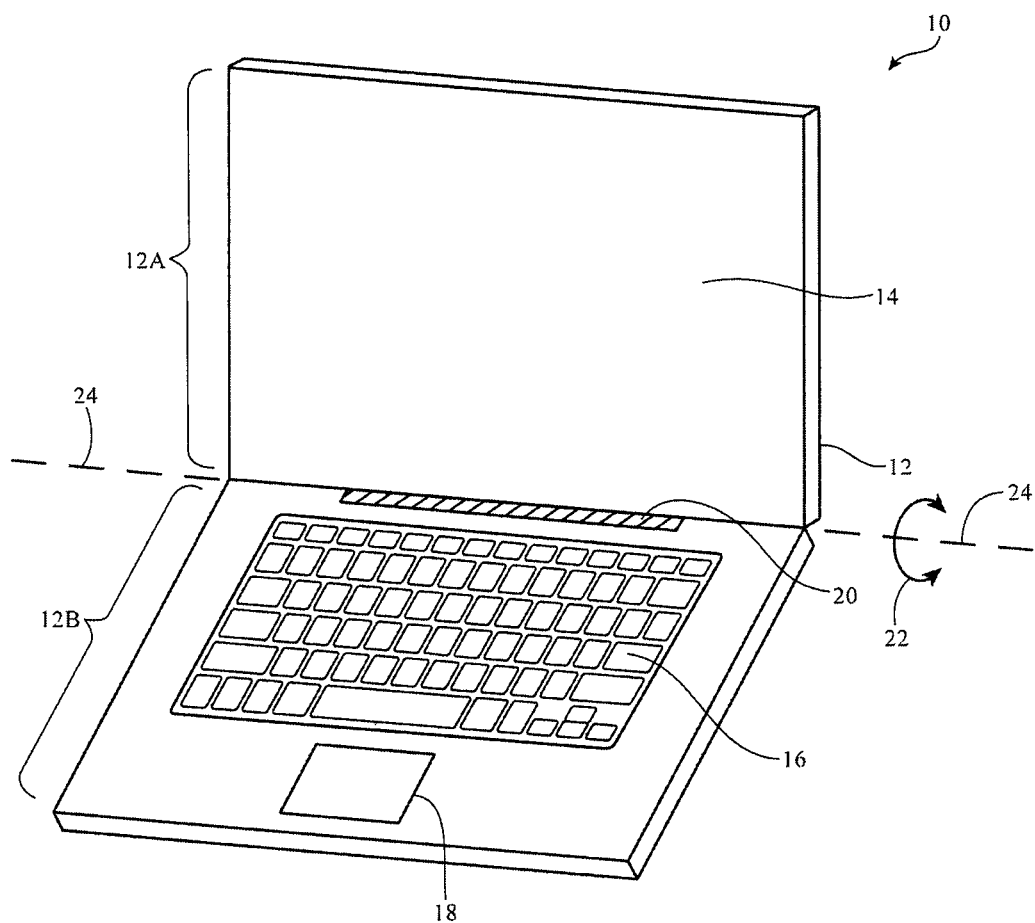
FIG. 1 is a perspective view of an illustrative electronic device such as a laptop computer in accordance with an embodiment.

Illustrative electronic device 10 of FIG. 1 has the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes be referred to as a display housing or lid, may be placed in a closed position by rotating upper housing 12A towards lower housing 12B about rotational axis 24.

Figure 2:
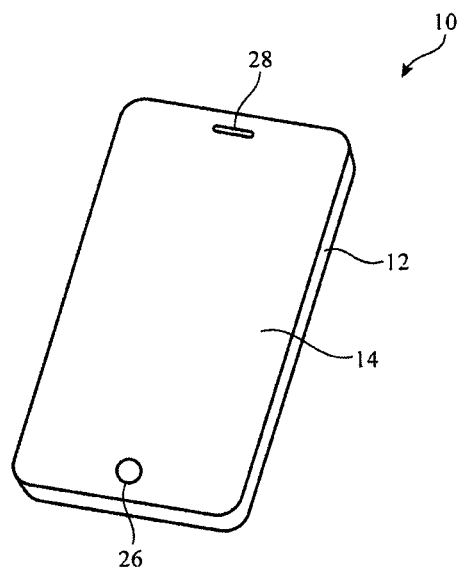
FIG. 2 is a perspective view of an illustrative electronic device such as a handheld electronic device in accordance with an embodiment.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
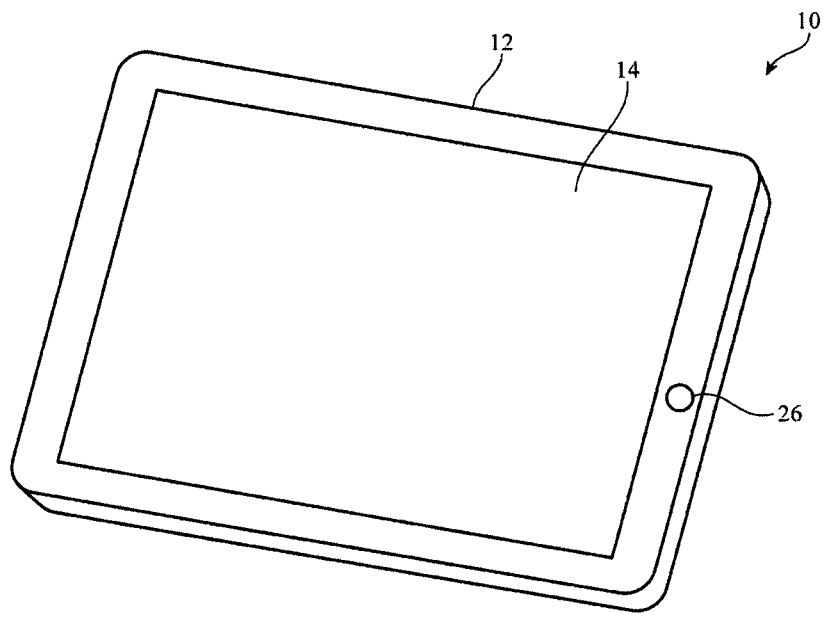
FIG. 3 is a perspective view of an illustrative electronic device such as a tablet computer in accordance with an embodiment.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
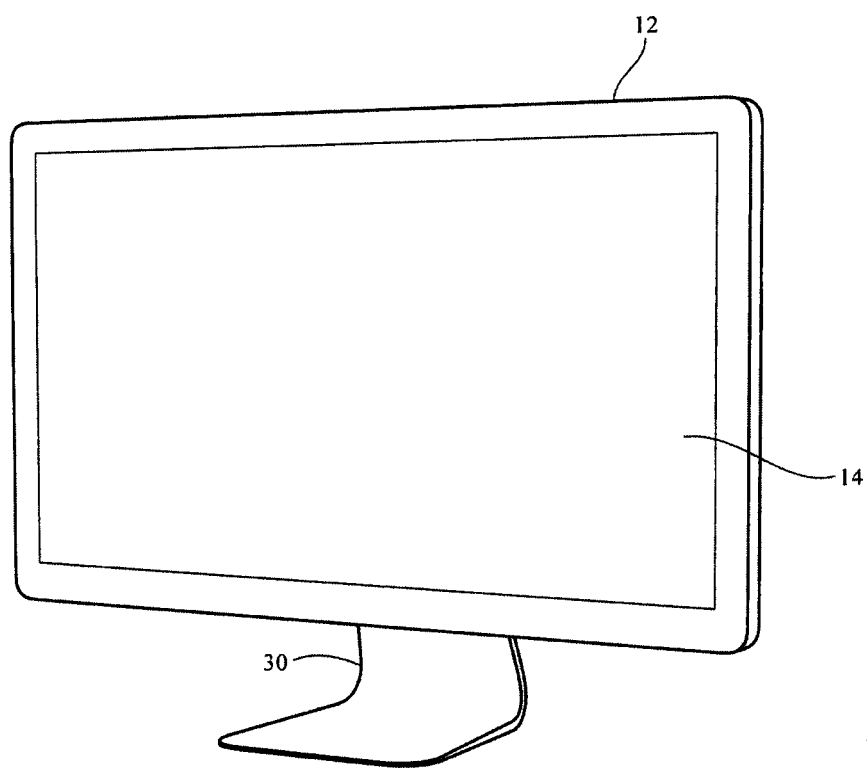
FIG. 4 is a perspective view of an illustrative electronic device such as a computer display in accordance with an embodiment.

FIG. 4 shows how electronic device 10 may be a computer display, a computer that has been integrated into a computer display, or a display for other electronic equipment. With this type of arrangement, housing 12 for device 10 may be mounted on a support structure such as stand 30 or stand 30 may be omitted (e.g., stand 30 can be omitted when mounting device 10 on a wall). Display 14 may be mounted on a front face of housing 12.

Figure 5:
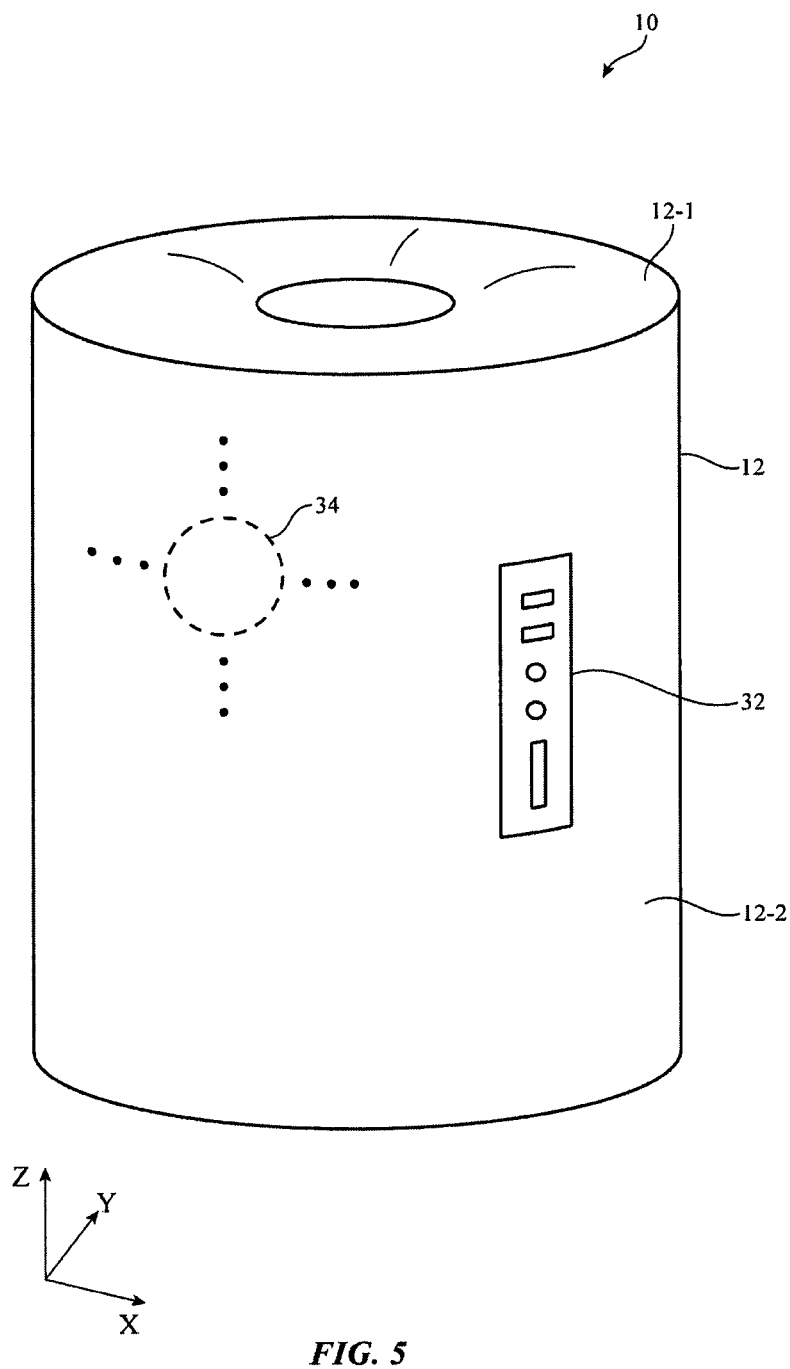
FIG. 5 is perspective of an illustrative electronic device such as a computing device or other device with a cylindrical housing that surrounds an interior region and that is surrounded by an exterior region in accordance with an embodiment.

FIG. 5 shows how electronic device 10 may have a cylindrical housing. Device 10 may be, for example, a desktop computer such as the Mac Pro computer available from Apple Inc. of Cupertino, Calif. Housing 12 may have an input-output connector region such as region 32 that contains input-output connectors (e.g., Universal Serial Bus connectors and other digital signal connectors, power connectors, audio connectors, memory card slots, and other input-output connectors). Upper surface 12-1 of housing 12 may be planar or may have curved surfaces (as shown in FIG. 5). Sidewall 12-2 of housing 12 may have a curved surface so that housing 12 has a cylindrical shape (as an example). Housing 12 may also have other shapes (e.g., conical shapes, pyramidal shapes with curved and/or planar sidewall surfaces, spherical housing shapes, other shapes, and combinations of these shapes).

Housing 12 may have a vertical dimension (height in dimension Z) that is larger than its lateral (horizontal) dimensions (i.e., widths in dimensions X and Y). Configurations in which housing 12 is shorter in height and wider in width may also be used. If desired, part of housing 12 may be cylindrical and part of housing 12 may have one or more planar sidewalls. For example, housing 12 may have the shape of a half cylinder in which the front portion of housing 12 has a cylindrical shape and the rear portion of housing 12 has a planar rear housing wall. Other shapes with cylindrical surfaces may also be used (e.g., quarter cylinders, three-quarter cylinders, etc.). Display 14 may be mounted in housing 12 or may be omitted from device 10 of FIG. 5.

The illustrative configurations for device 10 that are shown in FIGS. 1, 2, 3, 4, and 5 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, an accessory such as a charging station, a stand for a display, speaker or other electronic device, an alarm clock, a speaker, a docking station, an amplifier, a projector, a camera, a video camera, gaming equipment, a television cable box or other set-top box, lighting equipment, a motion sensor, a touch pad or other input-output device that gathers data from a touch sensor(s), networked attached storage or other data storage device, a wireless access point, a router, or other network equipment, other equipment, or equipment that implements the functionality of two or more of these devices.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 may include display pixels formed from liquid crystal display (LCD) components, organic light-emitting diode pixels, or other suitable image pixel structures. If desired, display 14 may be omitted from device 10 (e.g., to conserve space) or multiple displays such as display 14 may be included in device 10 (e.g., in an array). Light-based status indicators and other input-output devices may be used to supplement information displayed on display 14 or may be used to provide a user with status information and other output when display 14 has been omitted.

If desired, one or more electrical components may be mounted on housing 12. For example, a single component or an array of components may be mounted in the position(s) of illustrative component(s) 34 of FIG. 5 or elsewhere on housing 12 of FIG. 1, 2, 3, 4, or 5 or on other electronic device housings. Electrical components 34 may be mounted on a planar housing wall or a curved housing wall. Components 34 may, for example, be mounted an a surface of housing 12 where housing 12 has a non-planar surface such as where housing wall 12-2 of FIG. 5 is curved (e.g., curved on the side of a cylinder). In general, components 34 may be mounted on a curved surface such as a corner of a housing, a rounded edge of a housing, a curved sidewall, a curved front wall, a curved rear wall of housing 12, a curved top wall, etc. Configurations in which housing 12 has a cylindrical surface on which components 34 are mounted in an array (e.g., configurations of the type shown in FIG. 5 in which components 34 are mounted in an array on some or all of curved cylindrical outer surface 12-2 of housing 12) are sometimes described herein as an example.

The electrical components that are mounted to housing 12 such as components 34 of FIG. 5 may be electrical components such as light-emitting diodes, lamps, displays, lasers, or other light-emitting components, may be vibrators, buzzers, speakers, tone-generators, microphones, or other acoustic components, may be sensors such as touch sensors, temperature sensors, accelerometers, compasses, gyroscopes, position sensors, proximity sensors, or may be other suitable electronic components.

Figure 6:
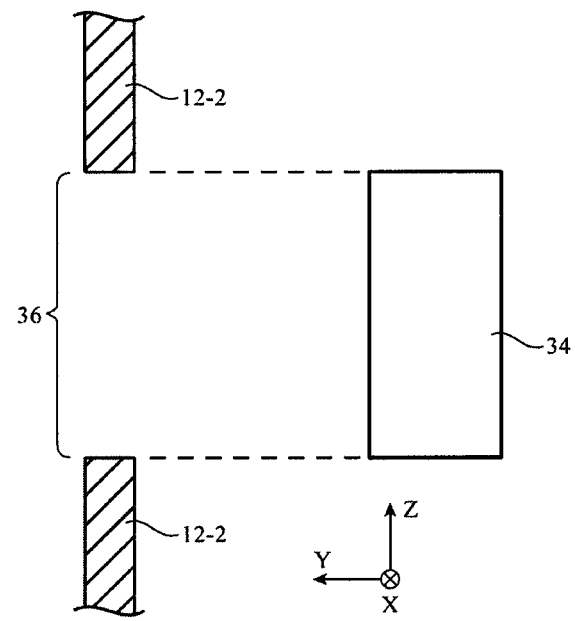
FIG. 6 is a cross-sectional side view of an illustrative electronic component being mounted in an opening in a device housing in accordance with an embodiment.

As shown in FIG. 6, each component 34 may be mounted in a respective opening in housing wall 12-2 such as opening 36. Component 34 may be mounted from the exterior of device 10 or from the interior of housing 12. After component 34 has been placed within opening 36, fasteners or other suitable attachment mechanisms (e.g., clips, adhesive, springs, other engagement features, etc.) may be used in securing component 34 to housing wall 12-2.

Figure 7:
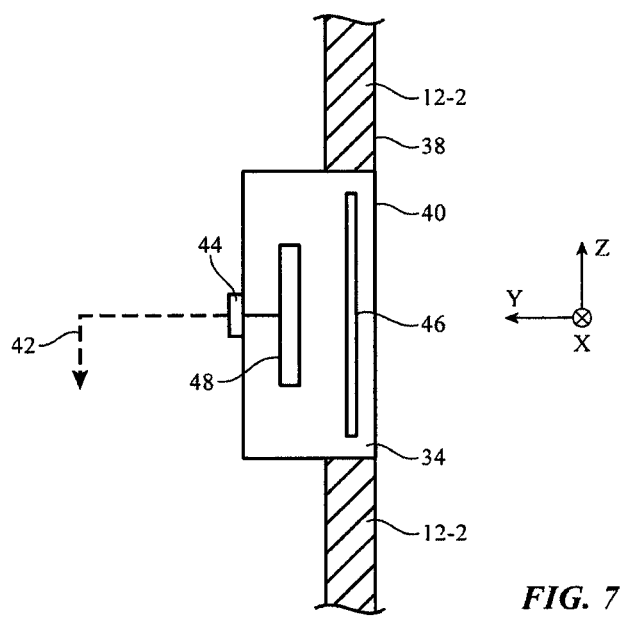
FIG. 7 is a cross-sectional side view of the illustrative electronic component of FIG. 6 following mounting of the component to the device housing in accordance with an embodiment.

As shown in FIG. 7, component 34 may be mounted so that some or all of exterior component surface 40 is flush (or nearly flush) with outer surface 38 of housing wall 12-2. In configurations in which housing wall 12-2 is curved (e.g., when wall 12-2 forms part of a cylinder), external component surface 38 may have a matching curved surface (e.g., some or all of the curvature of surface 40 of component 34 may match (or nearly match) the curvature of housing wall surface 38.

Electrical components 34 may be coupled to control circuitry using signal paths such as signal path 42 of FIG. 7. Signal path 42 may include one or more conductive lines on printed circuits or other substrates, wires, optical fibers, light-pipes, cables, plastic carriers with metal traces or other electrical signal lines, or other signal paths. The electrical and/or optical paths that are coupled to components 34 may be used to carry power signals, digital and/or analog signals (e.g., control signals, image data, audio signals, sensor information, etc.), or other signals.

Connectors such as connector 44 of FIG. 7 may be used to facilitate attachment of the electrical components to signal path 42. For example, components 34 may each have a respective connector such as connector 44 of FIG. 7 that mates with a corresponding connector on an optical and/or electrical cable or other signal path 42. Connector 44 may be a zero insertion force cable or other printed circuit connector, may be a coaxial connector or other rotationally symmetric connector for audio and/or radio-frequency signals, may be a power connector, may be a Universal Serial Bus connector or other digital data connector, may be an Ethernet connector, may be an audio connector, may be an optical connector, may be a male connector, may be a female connector, may be a locking connector, may be an reversible (orientation independent) connector with two or more operating positions, or may be any other suitable connector. If desired, connector 44 may have mating contacts that can be coupled and decoupled without using a fixed connection such as a solder or conductive adhesive connection Alternatively, connections between component 34 and a signal path may be made by using solder or conductive adhesive to join mating contacts (e.g., contacts on components 34 and mating contacts on a cable, printed circuit substrate, or other carrier with metal traces or other electrical signal lines).

Components such as component 34 of FIG. 7 may contain subcomponents such as subcomponents 46 and 48. Subcomponent 46 may be located near the front face of component 34 and may be a lens or lens system (e.g., when component 34 is an optical component), may be a diaphragm or speaker grill (e.g., when component 34 is a speaker), may be a microphone diaphragm, may be an optically or acoustically transparent window structure, may be a dielectric member (e.g., to form a window that allows electromagnetic signals for a sensor to pass through the window), may be a thermally conductive member that allows heat to pass into component 34, or may be other suitable front-of-component subcomponent. Subcomponent 48 may be a light source such as a light-emitting diode, laser, or lamp, may be a light detector such as an image sensor or photodetector, may be a speaker driver (e.g., a driver that drives a diaphragm), may be a temperature sensor such as a solid state temperature sensor or a thermocouple, may be a motion sensor, capacitive sensor, or other type of sensor, or may be other suitable electrical subcomponent for supporting the operation of component 34.

Figure 8:
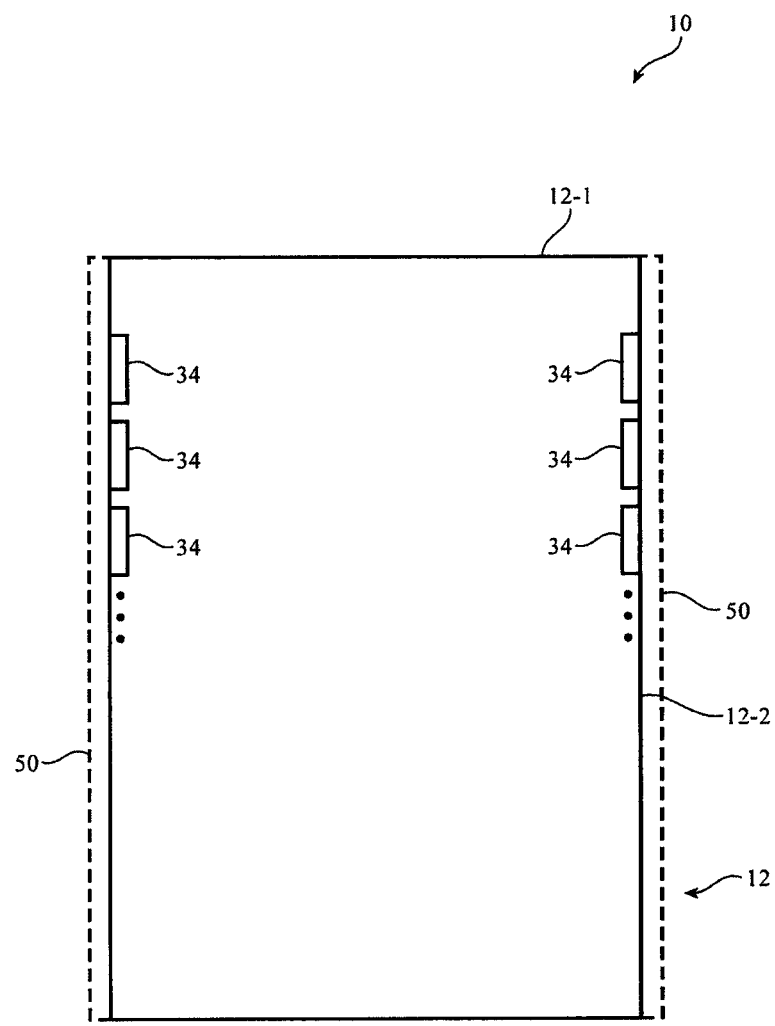
FIG. 8 is a cross-sectional side view of an electronic device showing how an array of components may be mounted to the exterior of a device housing in accordance with an embodiment.

If desired, components 34 may be mounted in a continuous (or nearly continuous) array of rows and columns on the outer curved surface of cylindrical housing wall 12-2, as shown in the illustrative cross-sectional side view of device 10 in FIG. 8. Components 34 may also be mounted on internal housing structures and/or walls such as upper wall 12-1. An optional covering such as covering 50 may be used to cover components 34. Covering 50 may be acoustically transparent (e.g., covering 50 may be a plastic mesh and/or metal mesh or other cover with openings to allow sound to pass), may be optically transparent (e.g., by using a transparent or semi-transparent material or pattern of material such as frosted glass, plastic with a thin semitransparent coating or patterned coating layer), may be sufficiently thermal conductive to allow temperature measurements to be made through covering 50 (e.g., a thin metal cover), or may be any other suitable covering structure for improving device aesthetics, enhancing component protection, etc.

There may be any suitable number of components 34 in the array of components on wall 12-2 (e.g., one or more, two or more, five or more, 10 or more, 20 or more, 50 or more 2-200, 5-150, 20-100, less than 100, less than 50, less than 300, less than 20, 20-70, 20-100, or other suitable number). The distance between adjacent components 34 may be less than 10 mm, 2-5 mm, less than 20 mm, more than 3 mm, between 1-15 mm, less than 5 mm, etc.

Figure 9:
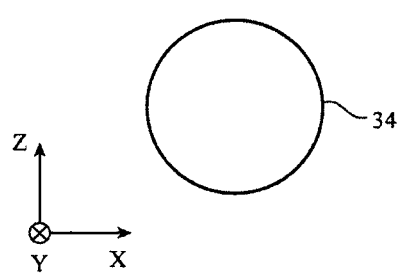
FIG. 9 is a front view of an illustrative electronic component with a circular outline in accordance with an embodiment.
Figure 10:
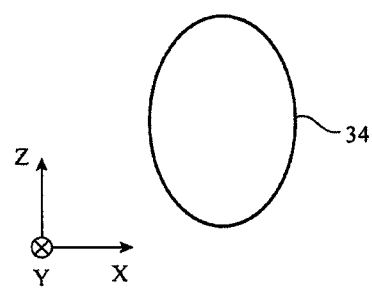
FIG. 10 is a front view of an illustrative electronic component with an oval outline in accordance with an embodiment.
Figure 11:
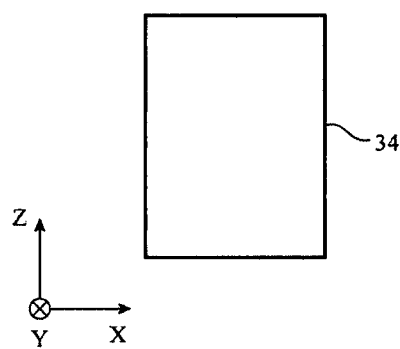
FIG. 11 is a front view of an illustrative electronic component with a rectangular outline in accordance with an embodiment.
Figure 12:
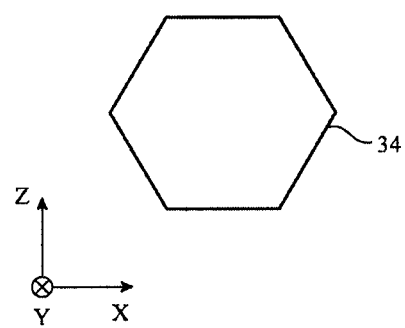
FIG. 12 is a front view of an illustrative electronic component with a hexagonal outline in accordance with an embodiment.

Components 34 may have any suitable shapes such as box shapes, frustoconical shapes (e.g., frustoconical shapes with planar and/or curved ends), pyramidal shapes, shapes with front surfaces that are wider than their opposing rear surfaces, shapes with curved edges and/or straight edges, shapes with curved front surfaces, etc.), cone shapes, step-wise varying cone shapes, spherical shapes, disk shapes, shapes with combinations of curved and straight edges and planar and/or curved sidewalls, etc.). FIGS. 9, 10, 11, and 12 are front views of illustrative shapes that may be used for components 34. In the example of FIG. 9, component 34 has a circular outline when viewed from the front (i.e., when viewed from the exterior of device 10 when component 34 has been mounted in housing sidewall 12-2). In the example of FIG. 10, component 34 has an oval outline when viewed from the front. FIG. 11 shows how component 34 may have a rectangular outline when viewed from the front. In the illustrative configuration of FIG. 12, component 34 has a hexagonal shape when viewed from the front. Other shapes may be used for component 34 if desired. The examples of FIGS. 9, 10, 11, and 12 are merely illustrative.

Figure 13:
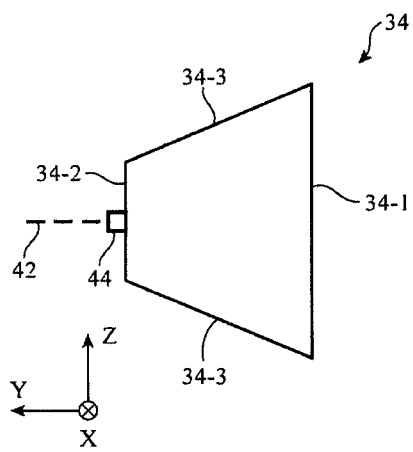
FIG. 13 is a cross-sectional side view of an illustrative electronic component with a trapezoidal cross section in accordance with an embodiment.
Figure 14:
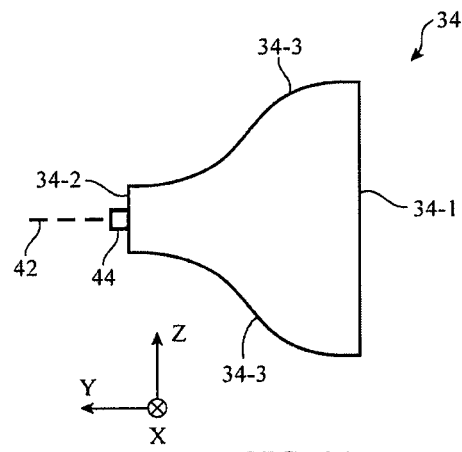
FIG. 14 is a cross-sectional side view of an illustrative electronic component with a smoothly tapered cross section in accordance with an embodiment.
Figure 15:
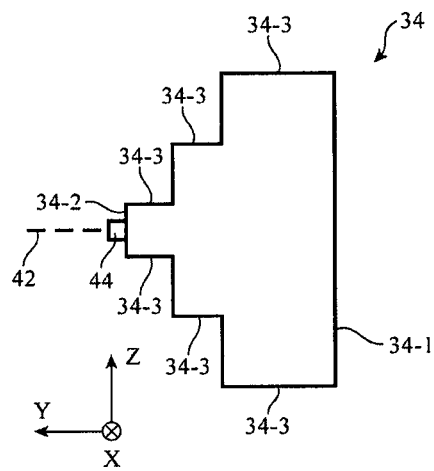
FIG. 15 is a cross-sectional side view of an illustrative electronic component with a cross section that is tapered in a step-wise fashion in accordance with an embodiment.
Figure 16:
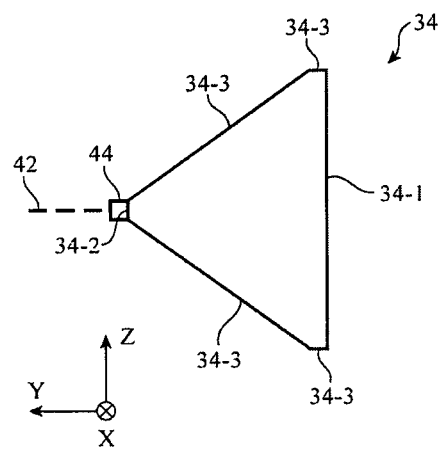
FIG. 16 is a cross-sectional side view of an illustrative electronic component with a cross section that is triangular in shape and has untapered portions in accordance with an embodiment.

Cross-sectional side views of components 34 of different illustrative shapes are shown in FIGS. 13, 14, 15, and 16. As shown in FIG. 13, component 34 may have a front face such as front face 34-1, an opposing rear face such as rear face 34-2, and side surfaces such as surfaces 34-3. Some or all of front face 34-1 may lie flush with outer surface 38 of housing 12-2 (i.e., front face 34-1 of component 34 may form exterior surface 40 of FIG. 7). In the example of FIG. 13, front face 34-1 has larger lateral dimensions (in vertical dimension Z and horizontal dimension X) than rear face 34-2. Side surfaces 34-3 form a tapering shape so that component 34 is wider at the front than at the rear. Side surfaces 34-3 are straight in the cross-sectional side view of FIG. 13. In the illustrative configuration of FIG. 14, side surfaces 34-3 have smoothly tapering curved profiles. FIG. 15 shows how side surfaces 34-3 may progressively narrow component 34 in a step-wise fashion. In the example of FIG. 16, side surfaces 34-3 have portions in which component 34 does not taper and portions in which component 34 tapers. Connector 44 may be mounted on rear surface 34-2 of component 34 or elsewhere in component 34. If desired, other side profiles may be used for component 34 (e.g., tapered and/or non-tapered profiles). The configurations of FIGS. 13, 14, 15, and 16 are shown as examples.

It may be desirable to provide front face 34-1 of component 34 with a surface shape that matches the surface shape of housing wall 12-2. For example, if housing wall 12-2 has a cylindrical shape with a curved (circular) outer surface, component 34 may have a matching curved outer surface.

Figure 17:
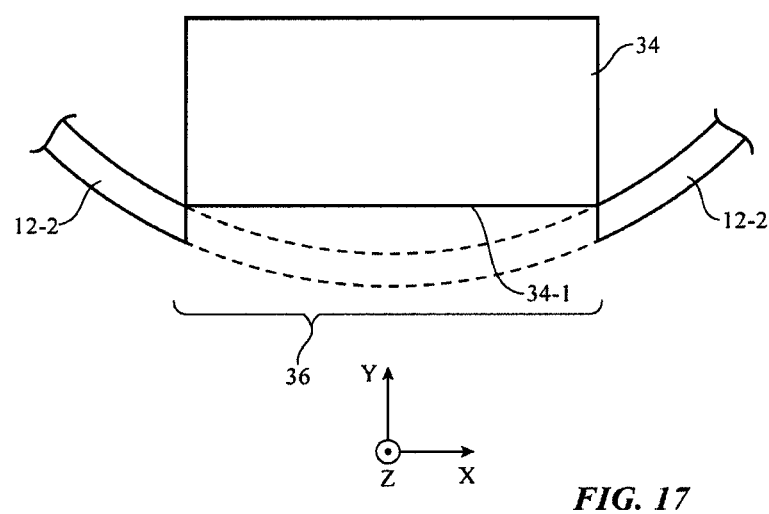
FIG. 17 is a top view of an illustrative component with a flat outer surface that has been mounted in an opening in a cylindrical housing in accordance with an embodiment.
Figure 18:
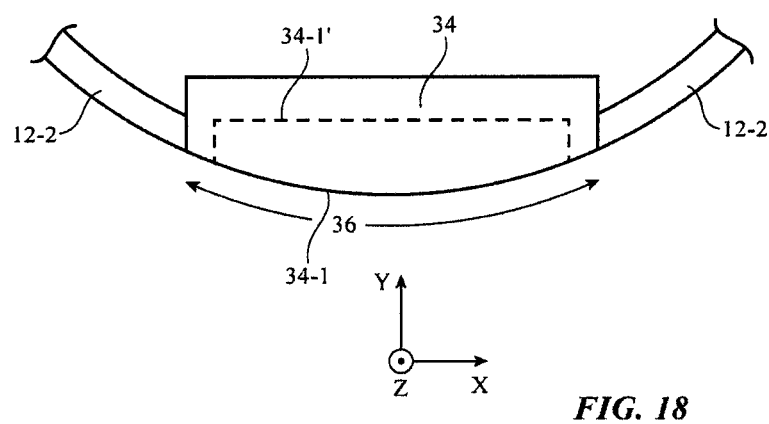
FIG. 18 is a top view of an illustrative component with a curved outer surface that has been mounted in an opening in a cylindrical housing in accordance with an embodiment.

FIG. 17 is a top view of an illustrative configuration in which component 34 has a front surface (surface 34-1) that is planar. As a result, surface 34-1 does not match the curvature of the curved outer surface of cylindrical housing wall 12-2. FIG. 18 shows how component 34 may be provided with a curved outer surface (surface 34-1) that matches the curved outer surface of cylindrical housing wall 12-2. If desired, peripheral edges of surface 34-1 or other portion of surface 34-1 may match the curved surface of cylindrical housing wall 12-2 and other portions (e.g., central portion 34-1') may have other surface shapes (e.g., protruding and/or recessed shapes, planar shapes, dome-shaped configurations, etc.).

Figure 19:
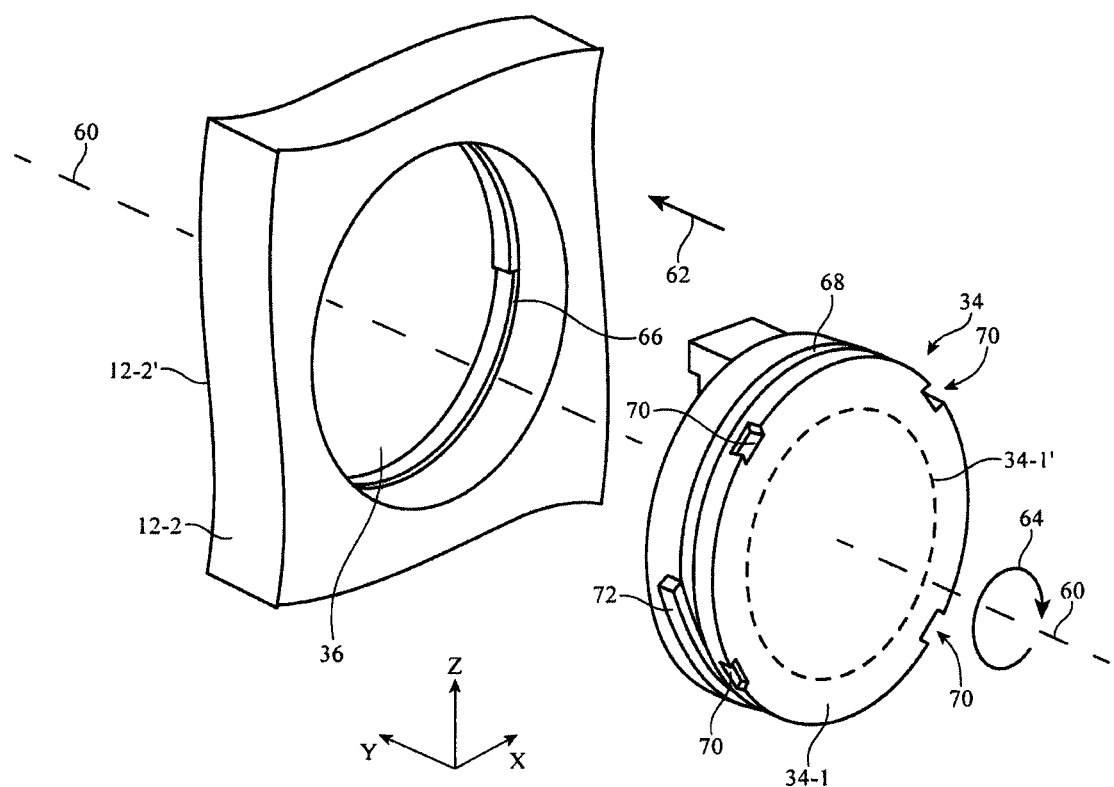
FIG. 19 is an exploded perspective view of an illustrative electronic device in which a component is being rotationally mounted in an opening in a housing with a curved surface such as a cylindrical housing in accordance with an embodiment.

FIG. 19 is an exploded perspective view of an illustrative rotationally mounted component. As shown in FIG. 19, housing wall 12-2 may have an opening such as opening 36 (e.g., a circular housing wall opening). Housing wall 12-2 may form part of a cylinder (i.e., wall 12-2 of FIG. 19 may be curved), may be planar, or may have other suitable shapes. Component 34 may be installed within opening 36 by moving component 34 inwardly in direction 62 and then rotating component 34 in direction 64 about rotational axis 60. Component 34 may have recesses 70 or other features around its periphery that engage with corresponding features (e.g., mating protrusions) on an installation tool to facilitate rotation of component 34 using the installation tool. The periphery of component 34 may be circular.

When component 34 is mounted in opening 36, gasket 68 may be compressed between component 34 and housing wall 12-2 (see, e.g., ridge 66 in opening 36), thereby forming a circumferential seal around the edge of component 34. When component 34 is inserted in opening 36, protrusions such as protrusion 72 may engage the inner surface of housing wall 12-2. During rotation of component 34, these protrusions may bear against the inner surface of wall 12-2 and may pull component 34 inwardly in direction 62 due to the curved shape of the inner wall surface.

Figure 20:
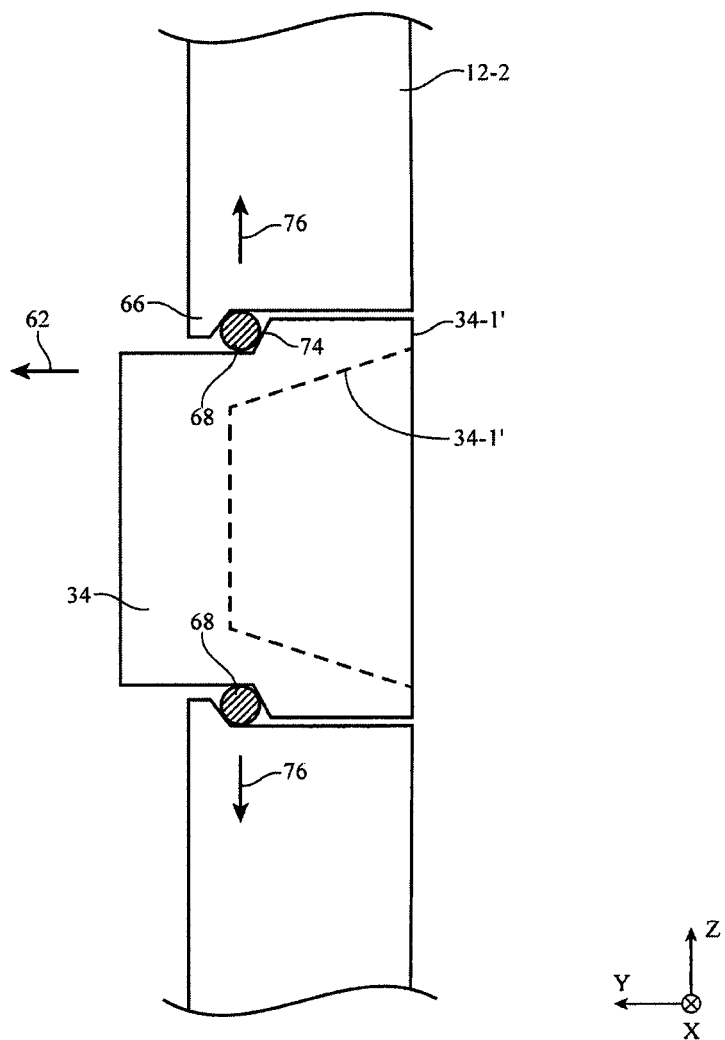
FIG. 20 is a cross-sectional top view of a component mounted in a housing such as a cylindrical housing showing how a gasket may help form a seal between the component and the housing in accordance with an embodiment.

As shown in FIG. 20, housing wall ridge 66 and opposing portions of component 34 such as portion 74 may have angled surfaces that drive ring-shaped gasket 68 outwardly in direction 76 during movement of component 34 in direction 68. This helps ensure that a satisfactory seal is formed between component 34 and housing 12.

Figure 21:
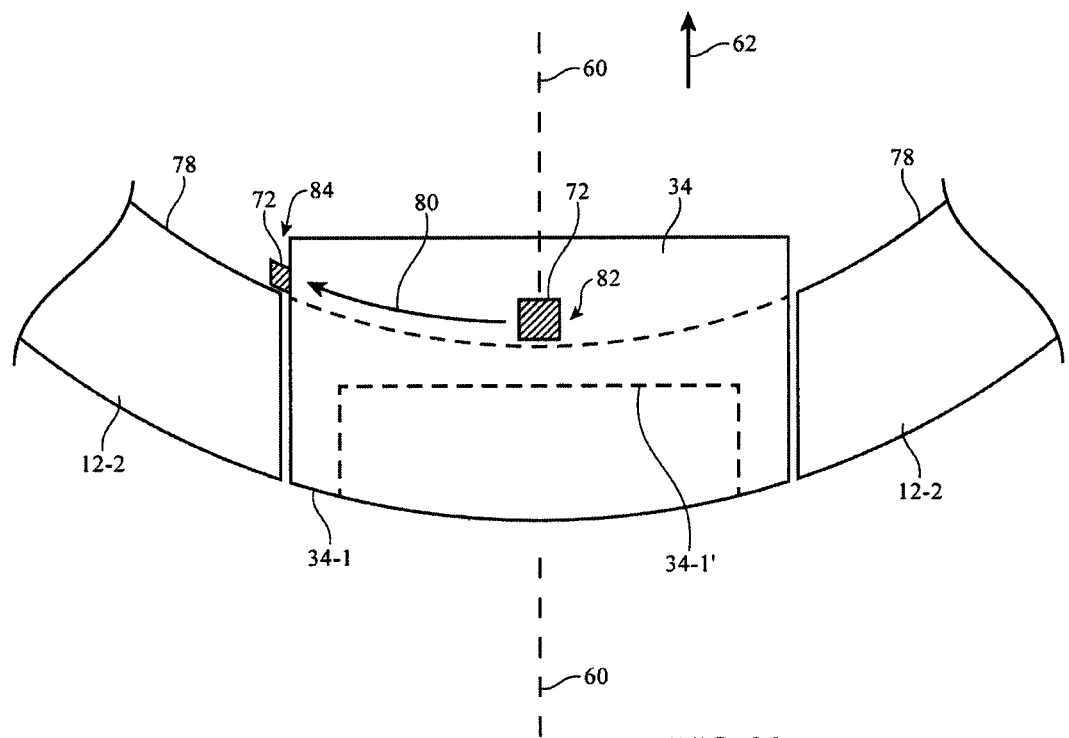
FIG. 21 is a cross-sectional top view of a component being rotationally mounted in a housing such as a cylindrical housing showing how a protrusion or other feature on the component may bear against an inner housing wall surface to draw the component against the housing as the component is rotated by a quarter turn in accordance with an embodiment.

FIG. 21 is a cross-sectional view of component 34 showing how protrusions such as protrusion 72 may engage inner surface 78 of housing wall 12-2. Initially, protrusion 72 may be located in position 82. As component 34 is rotated about axis 60 (e.g., by rotating component 34 by a quarter turn or other suitable amount), protrusion 72 will move from position 82 to position 84 in direction 80, riding along inner wall surface 78 of housing wall 12-2. The curvature of inner wall surface 78 interacts with protrusion 72 to pull component 34 inwardly in direction 62 as component 34 rotates protrusion 72 in direction 80. Component 34 may have a pair of protrusions 72 on opposing sides of component 34 or may have other numbers of protrusions 72.

Figure 22:
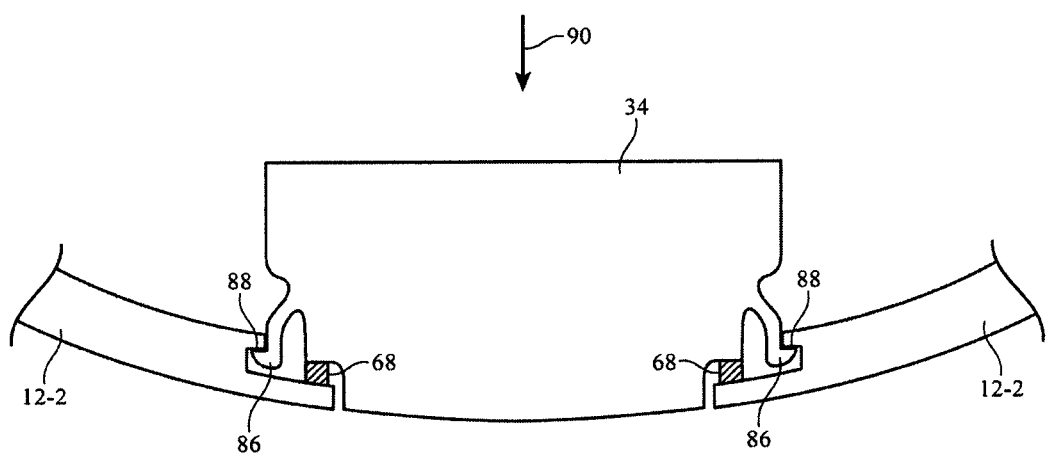
FIG. 22 is a cross-sectional top view of an illustrative component that is being mounted in a housing such as a cylindrical housing using snaps that interlock with recesses in the housing in accordance with an embodiment.
Figure 23:
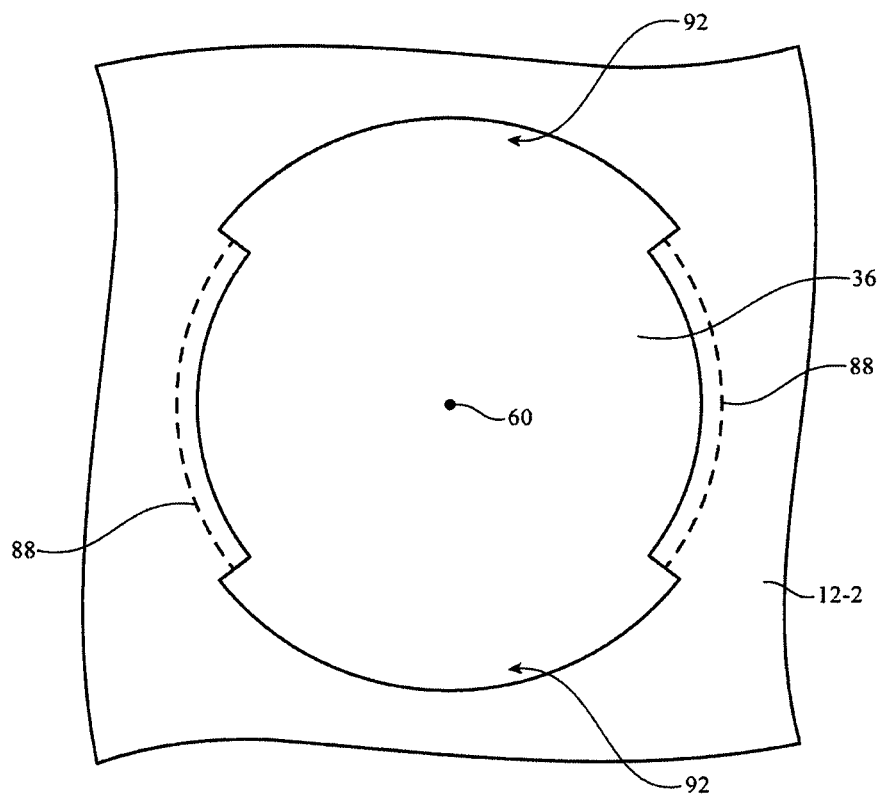
FIG. 23 is a front view of an illustrative housing having recesses to release the snaps of the component of FIG. 22 when the component is rotated in accordance with an embodiment.

If desired, component 34 may be mounted in housing wall 12-2 using flexible prongs 86. Prongs 86 may engage mating recesses such as groove(s) 88 in housing wall 12-2, thereby pulling component 34 outwardly in direction 90. Prongs 86 may be formed from metal or plastic and may be formed as portions of component 34 or as separate structures (e.g., structures that are attached to component 34). In configurations of the type shown in FIGS. 19, 20, and 21, component 34 may be mounted in housing wall 12-2 from the exterior of housing 12. In configurations of the type shown in FIG. 22, component 34 may be mounted in housing 12-2 from the interior of housing 12. As shown in FIG. 22, gasket 68 may be compressed between portions of component 34 and portions of housing wall 12-2, thereby sealing component 34 in the opening of wall 12-2.

It may be desirable to disengage prongs 86 to release component 34 from housing 12 (e.g., to repair component 34). With one suitable arrangement, opening 36 in housing 12 may be provided with radially enlarged portions such as portions 92. When it is desired to mount component 34 in housing wall 12-2, prongs 86 may be inserted into grooves 88 in housing wall 12-2. When it is desired to remove component 34 from housing wall 12-2, component 34 may be rotated so that prongs 86 move out of grooves 88 and into the space crated by radially outwardly enlarged portions 92. This releases prongs 86 and allows component 34 to be removed from housing wall 12-2.

Figure 24:
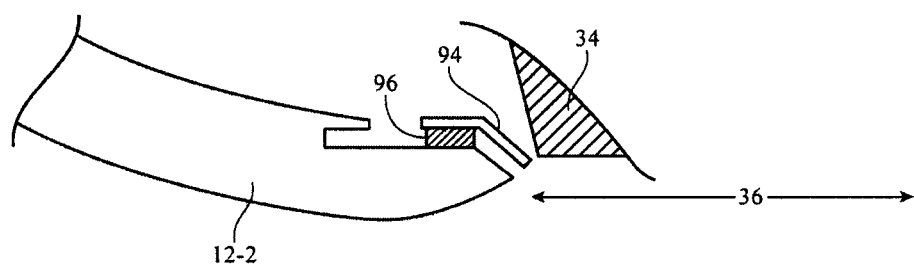
FIG. 24 is a cross-sectional view of a portion of a housing such as a cylindrical housing having a guide structure that helps seat a component in an opening in the housing in accordance with an embodiment.

It may be desirable to provide structures that help guide component 34 into opening 36 when installing component 34 in housing 12. As shown in FIG. 24, for example, component 34 may be guided into opening 36 in housing wall 12-2 using guide structure 94. Guide structure 94 may be a plastic or metal member with a planar portion that is attached to the inner surface of housing wall 12-2 using adhesive 96 and an angled portion that forms a guiding ramp that helps guide component 34 into a desired position in opening 36 without allowing component 34 to strike wall 12-2 and potentially be damaged by wall 12-2.

Figure 25:
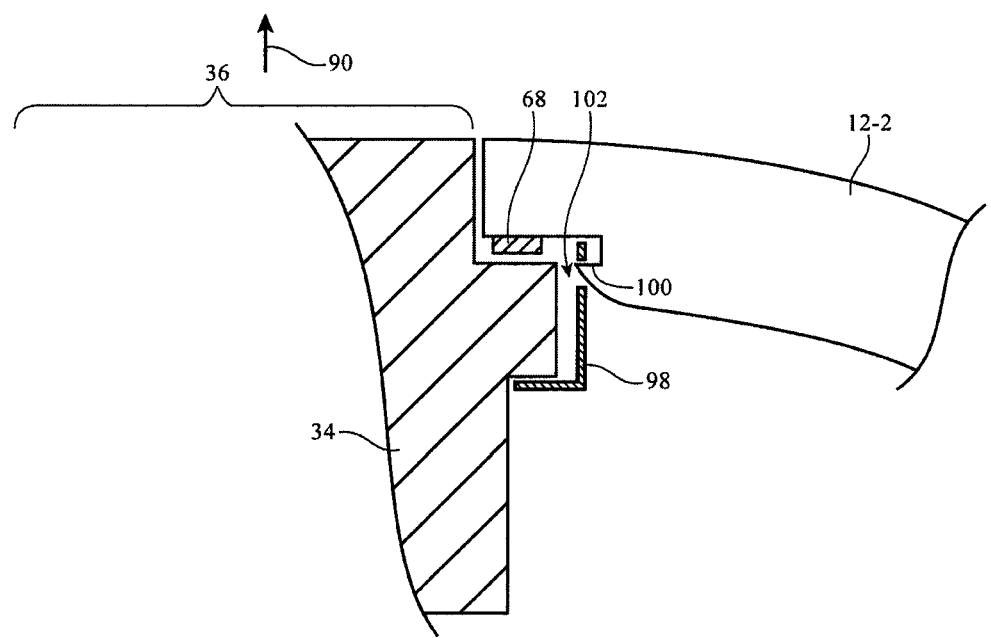
FIG. 25 is a cross-sectional view of a portion of a housing and component being joined using a slotted component retention member in accordance with an embodiment.

FIG. 25 is a cross-sectional side view of an illustrative component that is being mounted in housing 12 using a retention member. Retention member 98 or other attachment structure may be formed from metal, plastic, or other materials and may be formed as an integral portion of component 34, as a separate structure that is attached to component 34 using adhesive, screws or other fasteners, or other attachment mechanisms. When component 34 is moved into opening 36 in direction 90 from the interior of housing 12, retention member 98 will flex so that the tip of retention member 98 rides up and over protrusion 100 on housing wall 12-2 until protrusion 100 is received within opening 102 of retention member 98. There may be a series of protrusions 100 around the circular edge of opening 36 and a corresponding set of protruding retention member portions with openings 102 around the circular periphery of component 34. The engagement between each protrusion 100 and each opening 102 helps to secure component 34 to housing wall 12-2 within opening 36.

Figure 26:
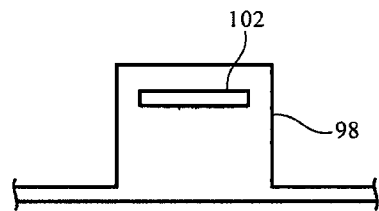
FIG. 26 is a front view of a slotted member of the type that may be used to join the component and housing of FIG. 25 in accordance with an embodiment.

FIG. 26 shows how opening 102 may have the shape of an elongated slot in retention member 98. Other types of engagement features (circular openings, prongs, etc.) may be used if desired. The use of slot-shaped openings and corresponding slot-shaped protrusions 100 on housing wall 12-2 to engage the slot-shaped openings is merely illustrative. Retention member 98 may have a ring portion that surrounds the circular periphery of component 34. Tab-shaped portions such as the structure of FIG. 26 may protrude from the ring portion (i.e., the retention member portions formed from the tabs on the ring may each engage a separate corresponding protrusion 100).

Figure 27:
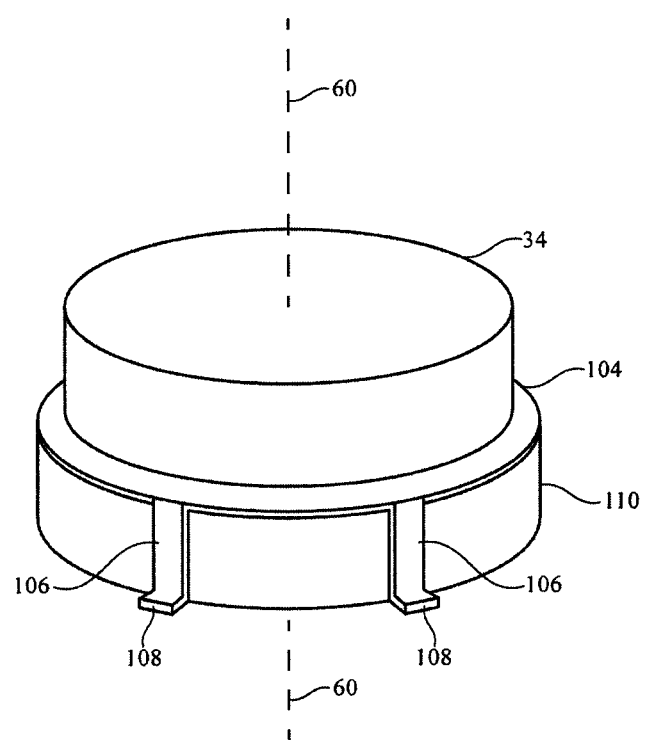
FIG. 27 is a perspective view of an illustrative component and an associated rotating locking ring that may be used in mounting the component to a housing in accordance with an embodiment.

A perspective view of an illustrative component mounting structure based on a rotating locking ring is shown in FIG. 27. In the example of FIG. 27, locking ring 104 has a circular ring shape that surrounds component 34. Prongs 106 protrude downward (in the orientation of FIG. 27) along the edges of cam structure 110. Outwardly protruding tabs 108 may be located at the ends of prongs 106. Cam structure 110 may be formed from plastic, metal, or other suitable materials and may be formed as part of component 34 or a separate structure that is attached to component 34.

To lock component 34 to housing 12, component 34 and the locking ring structures of FIG. 27 may be inserted in opening 36 of housing 12. Ring 104 may then be rotated about rotational axis 60. During rotation, the surfaces of cam structure 110 may cause ring 104 to engage with structures in housing 12, thereby mounting component 34 to housing 12.

Figure 28:
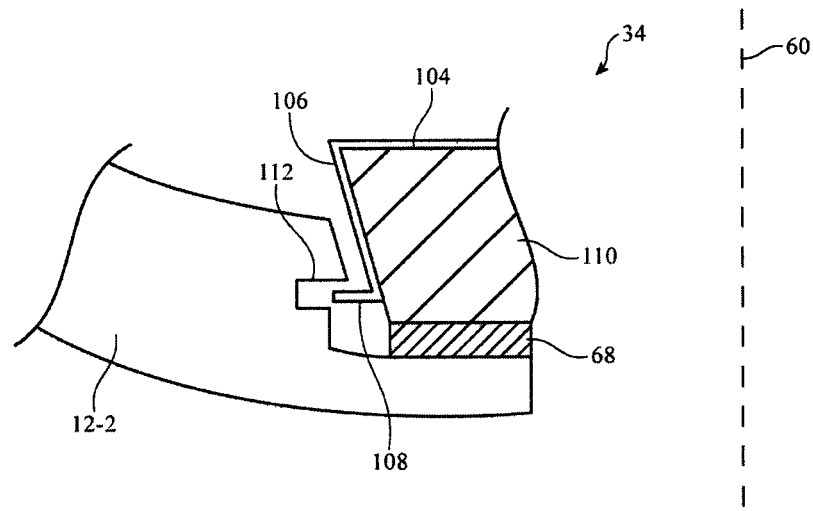
FIG. 28 is a cross-sectional side view of an illustrative component with a rotating locking ring before the locking ring has locked the component into place in a housing in accordance with an embodiment.

FIG. 28 is a cross-sectional view of component 34 of FIG. 27 in a configuration in which ring 104 has not yet been rotated to secure component 34 in housing 12. Housing wall 12-2 or other portions of housing 12 may be provided with grooves such as groove 112 to receive corresponding tabs such as tab 108. In a configuration of the type shown in FIG. 28 in which locking ring 104 has not yet been rotated, the surfaces of cam structure 110 will not force tabs 108 outward and tabs 108 will not protrude into grooves 112.

Figure 29:
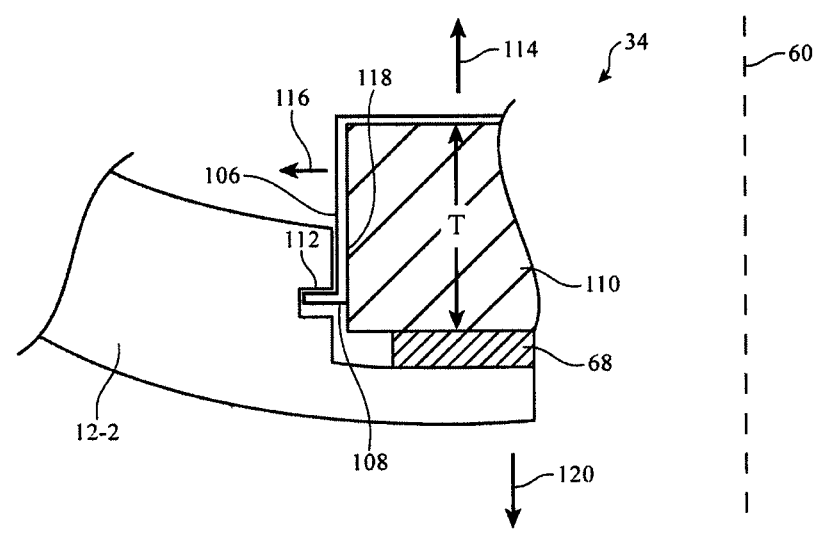
FIG. 29 is a cross-sectional side view of the illustrative component of FIG. 28 that has been mounted in a housing such as a cylindrical housing by rotation of the locking ring of FIG. 28 against cam structures in accordance with an embodiment.

When it is desired to mount component 10 to housing 12-2, rotating locking ring 104 may be rotated about rotational axis 60. Portion 110 of component 34 forms a cam structure. The slope of the sidewall of the cam structure varies continuously as a function of rotational position around axis 60. Initially, the outer cam surface against which prong 106 bears is inwardly sloped as shown in FIG. 28. Following rotation about axis 60, locking ring prong 106 will be moved to a location in which outer wall surface 118 of cam portion 110 of component 34 has become more vertical, pushing prong 106 outward in direction 116, as shown in FIG. 29. This pushes tab 108 at the end of prong 106 into engagement with groove 112 in housing wall 12-2. At the same time, the thickness T of cam portion 110 increases from a first thickness when prong 106 is in the location of prong 106 in FIG. 28 and a second thickness when prong 106 is in the location of prong 106 in FIG. 29. This increase in the thickness of the cam structure as tab 108 rotates along cam structure 110, forces tab 108 upward in direction 114. As tab 108 is pulled upward within groove 112, portion 110 of component 34 is pulled outward towards the exterior of device 10 in direction 120, thereby compressing gasket 68 between portion 110 and housing wall 12-2.

If desired, components 34 may be mounted in openings in housing 12 using a configuration in which a cover or other structure screws into a component mounting structure with a mounting cavity. A component to be mounted in housing 12 may be mounted in opening 36 between a cover on the exterior of housing 12 that is screwed into a component mounted structure in the interior of housing 12. The component mounting structure may have a dish shape or other shape with a mounting cavity that is configured to receive component 34. The cover may be a structure with openings (e.g., a guard structure for a speaker diaphragm, a guard structure for a lens in a light-based component, etc.).

Figure 30:
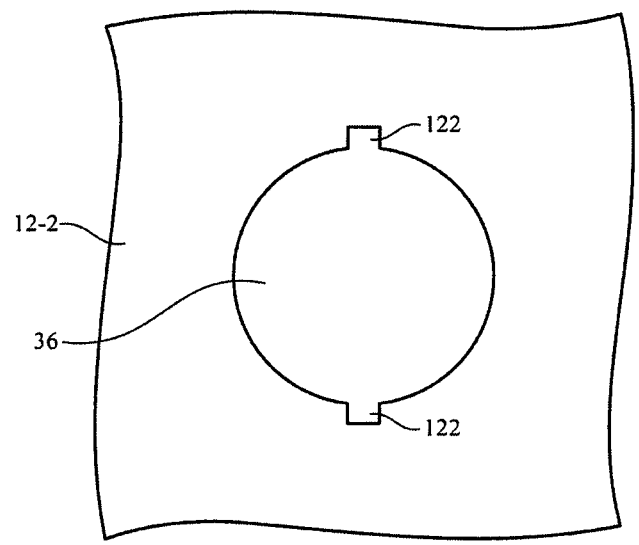
FIG. 30 is a front view of an illustrative housing opening with radially outward protruding portions in accordance with an embodiment.

Consider, as an example, the illustrative shape for opening 36 in housing wall 12-2 (e.g., a cylindrical housing wall) that is shown in FIG. 30. Opening 36 may have a circular shape that is configured to receive a circular component. The component may have a circular periphery that fits through opening 36 of FIG. 30 and may be mounted from the interior or exterior of housing 12. Opening 36 may have radial protrusions 122 to facilitate removal of a component mounting structure from the interior of housing 12 for repair. Protrusions 122 may also facilitate insertion of a component mounting structure into the interior of housing 12 during component mounting.

Figure 31:
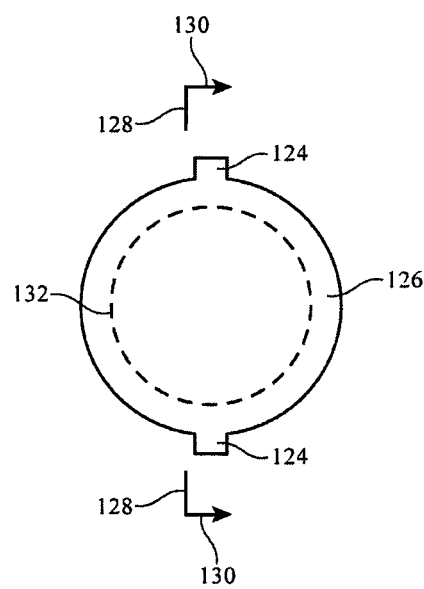
FIG. 31 is a component mounting structure that can be used to mount a component in the housing opening of FIG. 30 in a housing wall such as a cylindrical housing wall in accordance with an embodiment.

An illustrative component mounting structure that may be used to secure a component in opening 36 of FIG. 30 is shown in FIG. 31. Component mounting structure 126 may have a recessed portion forming a cavity such as cavity 132 into which component 34 may be received when mounting component to housing 12. Component mounting structure 126 may be, for example, a dish-shaped plastic cap. Protrusions 124 of component mounting structure 126 may be large enough to cover protrusions 122 in housing opening 36. When it is desired to remove component mounting structure 126 from the interior of housing 12, component mounting structure 126 may be rotated sideways so that protrusions 124 can slide through protrusions 122 in opening 36 (as an example). Component mounting structure 126 may be mounted to the interior surface of housing wall 12-2 using adhesive, screws, or other suitable attachment mechanisms. A cover may be attached to housing 12 and/or component mounting structure 126 using screw threads, using screws, using adhesive, using snaps, or using other attachment mechanisms.

Figure 32:
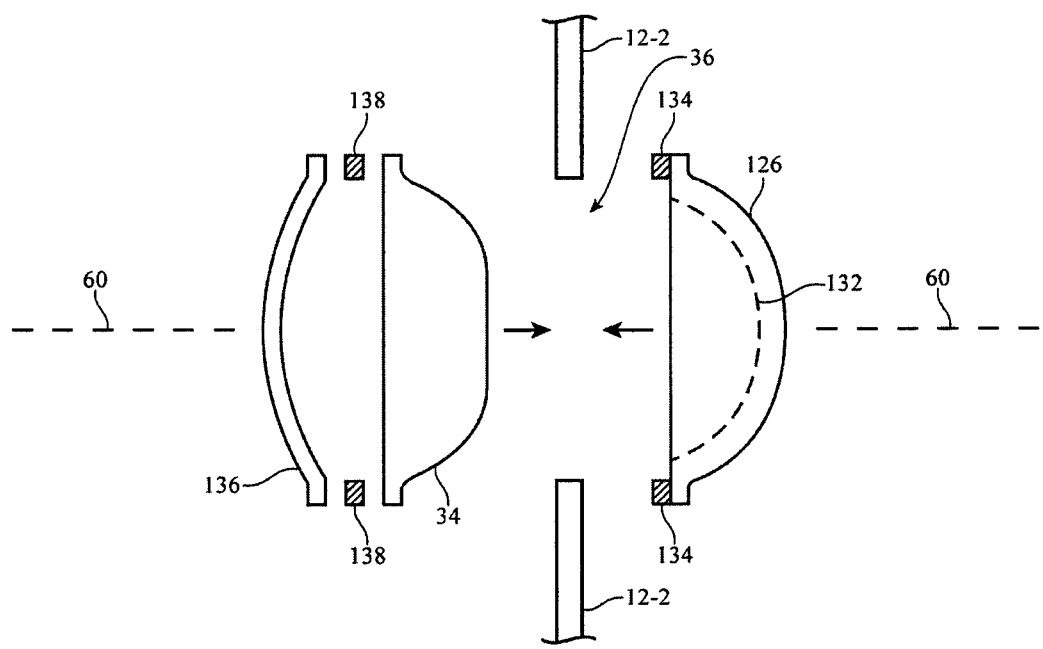
FIG. 32 is an exploded cross-sectional side view of an illustrative component and component mounting structure for mounting the component in a housing opening in accordance with an embodiment.

An exploded cross-sectional side view of optional component cover 136, component 34, housing wall 12-2, and component mounting structure 126 (taken along line 128 and viewed in direction 130) is shown in FIG. 32. As shown in FIG. 32, component mounting structure 126 may have a curved rear surface and an interior such as cavity 132 that is configured to receive component 34. Component mounting structure 126 may be mounted to the interior of housing wall 12-2 using adhesive 134 or other attachment mechanisms (screws, snaps, etc.). Component 34 and component mounting structure 126 may have mating threads that allow component 34 to be secured to component mounting structure 126 by screwing component 34 into component mounting structure 126 (i.e., by rotating component 34 about axis 60). Component 34 may also be mounted using adhesive, screws, or other attachment mechanisms. When component 34 is secured in place, component mounting structure will be pulled against the interior surface of wall 12-2 and will form a seal with housing wall 12-2.

Optional component cover 136 may be press fit within opening 36, may be attached to component 34 or housing wall 12-2 using adhesive 138, may be screwed into threads on component 34 and/or housing wall 12-2, or may be otherwise attached to device 10. Component cover 136 may have openings to permit the passage of sound and/or light. For example, component cover structure 136 may have crossed members that serve as a guard structure for component 34 without blocking sound and light.

Figure 33:
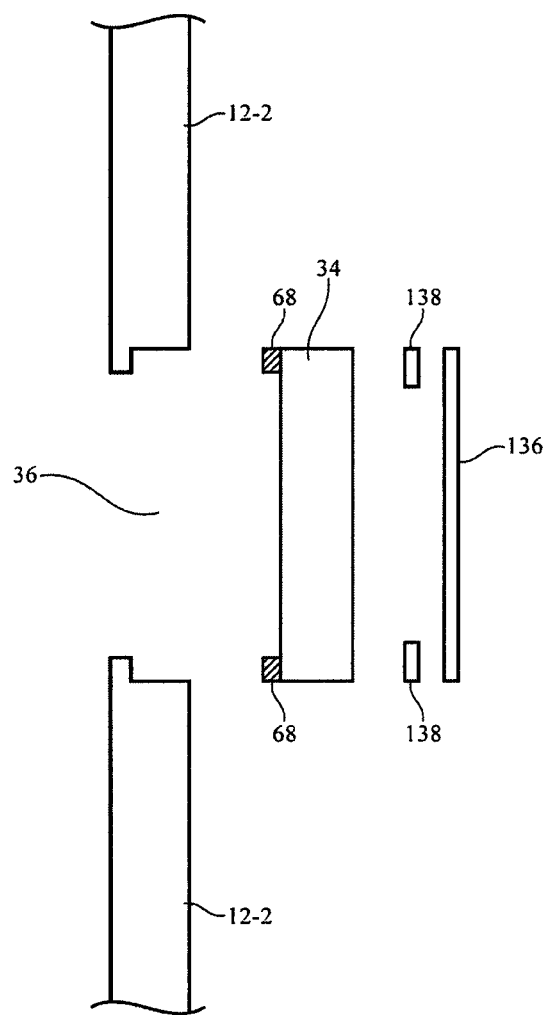
FIG. 33 is an exploded perspective view of an illustrative electrical component, cover structure, and housing having an opening to receive the component and cover structure in accordance with an embodiment.

FIG. 33 is an exploded perspective view of an illustrative electrical component, component cover, and housing having an opening to receive the component and cover structure. Component 34 of FIG. 33 may, if desired, be mounted in opening 36 of housing wall 12-2 using a quarter-turn mounting arrangement of the type described in connection with FIGS. 19, 20, and 21. Component cover 136 of FIG. 33 may be mounted over the front face of component 34 using a ring of adhesive 138. Component cover 136 (e.g., cover 136 of FIG. 32 and other device arrangements) may be formed from a mesh, crossed members, or other structure that has openings to permit sound and/or light to pass between component 34 and the surroundings of device 10.

Figure 34:
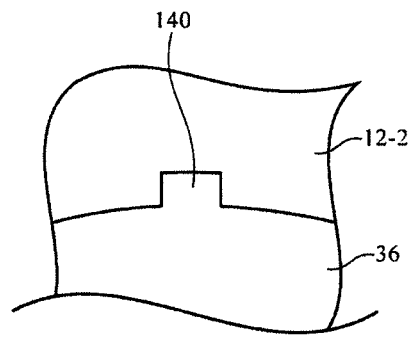
FIG. 34 is a front view of a portion of a portion of a housing having an interlock feature that mates with a corresponding interlock feature on a component guard structure or other cover in accordance with an embodiment.
Figure 35:
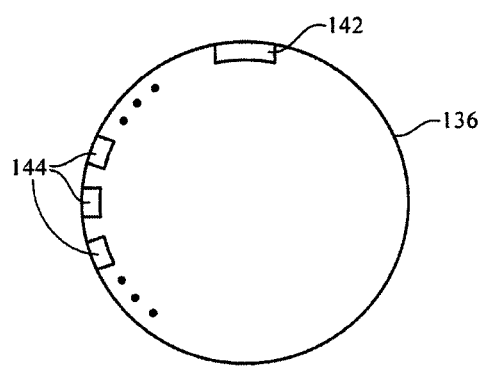
FIG. 35 is a front view of an illustrative component guard structure or other cover structure having an interlock feature that mates with the housing interlock feature of FIG. 34 and that has interlock features that mate with component interlock features in accordance with an embodiment.

FIG. 34 is a front view of a portion of a housing having an interlock feature that mates with a corresponding interlock feature on a component cover structure (component guard). As shown in FIG. 34, opening 36 may have one or more radially extending portions such as groove 140 of FIG. 34. There may be, for example, a pair of grooves 140 on opposing sides of opening 36 or may be a single groove 140 on the periphery of opening 36. Other configurations (e.g., configurations in which there are more than two grooves 140) may also be used. Each groove 140 serves as an alignment and locking feature to rotationally position component cover 136 relative to housing 12.

Figure 36:
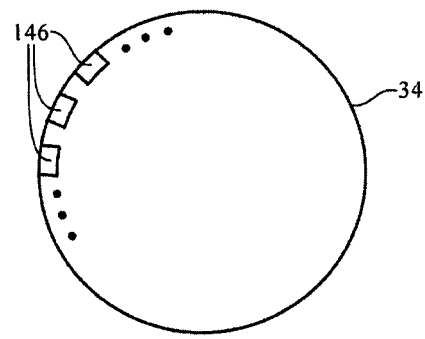
FIG. 36 is a front view of an illustrative component having component interlock features that mate with corresponding interlock features on the component guard structure of FIG. 35 in accordance with an embodiment.

Component cover 136 may have one or more alignment features such as illustrative alignment feature 142. Feature 142 may be, for example, a protrusion that mates with groove 140 of FIG. 34. Cover structure 136 may also have one or more alignment features such as tabs 144 or other features (protrusions, recesses, etc.) that are configured to mate with corresponding alignment features on the outer face of component 34. As shown in FIG. 36, for example, component 34 may have a series of notches 146 that run around the periphery of component 34. When component 34 is installed within opening 36, there is a potential for rotational movement between component 34 and housing wall 12-2. Cover 136 can be installed over component 34 so that feature 142 interlocks with feature 140 on housing 12-2, thereby locking cover 136 to housing 12-2 and preventing rotational movement of cover 136 with respect to housing wall 12-2. At the same time, features 144 on cover 136 may engage features 146 on component 34, thereby preventing component 34 from rotating relative to cover 136. Because relative rotational movement between cover 136 and housing 12-2 is prevented by the engagement between features 140 and 142 and because relative rotational movement between cover 136 and component 34 is prevented by the engagement between features 144 and features 146, rotational movement of component 34 relative to housing wall 12-2 is prevented.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
a housing have a housing wall with an opening; and
an electrical component having a protrusion that bears against an inner surface of the housing wall and pulls the electrical component into the opening when the electrical component and protrusion are rotated about a rotational axis.

2. The electronic device defined in claim 1 further comprising a ring-shaped gasket that is compressed between the electrical component and a portion of the housing wall to seal the component within the opening.

3. The electronic device defined in claim 2 wherein the portion of the housing wall comprises a ridge in the housing that is formed within the opening.

4. The electronic device defined in claim 3 wherein the electronic component has a circular periphery and a plurality of notches on the circular periphery.

5. The electronic device defined in claim 3 wherein the ridge and an opposing portion of the electrical component have angled surfaces that drive the gasket radially outwards when the gasket is compressed between the electrical component and ridge.

6. The electronic device defined in claim 3 wherein the protrusion and inner surface of the housing wall are configured to secure the electrical component within the opening when the electrical component is rotated about the axis by a quarter turn.

7. The electronic device defined in claim 3 wherein the electrical component comprises a component selected from the group consisting of: a light source, a light detector, a speaker, and a sensor.

8. The electronic device defined in claim 7 wherein the inner surface of the housing wall comprises a curved inner surface.

9. The electronic device defined in claim 7 wherein the housing comprises a cylindrical housing and wherein the inner surface comprises a curved inner surface, wherein the opening comprises one of a plurality of openings in the housing wall, and wherein the electrical component comprises one of a plurality of electrical components in the plurality of openings.

10. An electronic device, comprising:
a housing having a curved housing wall defining an opening and grooves arranged along a periphery of the opening; and
an electrical component having prongs that are received within the grooves in the opening of the curved housing wall,
wherein the housing defines radially recessed portions distributed along the periphery of the opening that release the prongs from the grooves in response to rotation of the electrical component.

11. The electronic device defined in claim 10 wherein the electrical component comprises a component selected from the group consisting of: a light source, a light detector, a speaker, and a sensor.

12. The electronic device defined in claim 11 further comprising a ring-shaped gasket that is compressed between peripheral portions of the electrical component and portions of the housing wall surrounding the opening.

13. The electronic device defined in claim 10 wherein the opening is circular, wherein the housing is cylindrical, wherein the opening in the housing wall is one of a plurality of openings, and wherein the electrical components having prongs is one of a plurality of electrical components having prongs in the openings.

14. The electronic device defined in claim 13 further comprising a guide structure that has an angled portion forming a guiding ramp that guides the electrical component into the opening without striking the housing wall.

15. An electronic device, comprising:
a housing having a curved housing wall with a circular housing wall opening having an edge, wherein the housing comprises radial protrusions extending into the circular housing wall opening;
an electrical component in the circular housing wall opening; and
a retention member that holds the electrical component in the circular housing wall opening, wherein the retention member comprises a plurality of axial protrusions, each axial protrusion defining an opening that receives a corresponding one of the radial protrusions.

16. The electronic device defined in claim 15 wherein the electrical component comprises a component selected from the group consisting of: a light source, a light detector, a speaker, and a sensor.

17. The electronic device defined in claim 16 further comprising a ring-shaped gasket that is compressed between peripheral portions of the electrical component and portions of the housing wall along the edge of the circular housing wall opening, wherein the circular housing wall opening is one of a plurality of circular housing wall openings in the curved housing wall, and wherein the electrical component is one of a plurality of electrical components in the circular housing wall openings.

18. An electronic device, comprising:
a housing having a curved housing wall with a circular housing wall opening and having grooves in the circular housing wall opening;
an electrical component in the circular housing wall opening having a cam structure; and
a rotating locking member that has prongs with tabs, wherein the rotating locking member is rotated so that the cam structure presses the prongs outwardly into the grooves and pulls the electrical component against the housing.

19. The electronic device defined in claim 18 wherein the electrical component comprises a component selected from the group consisting of: a light source, a light detector, a speaker, and a sensor.

20. The electronic device defined in claim 19 further comprising a ring-shaped gasket that is compressed between the electrical component and portions of the housing wall surrounding the circular housing wall opening.

21. The electronic device defined in claim 20 wherein the circular housing wall opening is one of a plurality of circular housing wall openings in the curved housing wall, and wherein the electrical component is one of a plurality of electrical components in the circular housing wall openings.

22. An electronic device, comprising:
a housing having a curved housing wall defining a housing wall opening and recesses extending radially outward from the housing wall opening;
an electrical component in the housing wall opening;
a component mounting structure having a cavity that receives the electrical component, wherein the component mounting structure is mounted to an interior surface of the curved housing wall and includes portions that cover the recesses; and
a component cover structure that is mounted to the curved housing wall covering the electrical component in the housing wall opening.

23. The electronic device defined in claim 22 wherein the component cover structure has openings.

24. The electronic device defined in claim 22 wherein the electrical component is screwed into the component mounting structure.

25. The electronic device defined in claim 24 wherein:
the electrical component comprises a component selected from the group consisting of: a light source, a light detector, a speaker, and a sensor; and
the circular housing wall opening is one of a plurality of circular housing wall openings in the curved housing wall.

26. An electronic device, comprising:
a housing having a housing wall, wherein the housing wall has an opening and an engagement feature adjacent to the opening;
an electrical component that is mounted in the opening, wherein the electrical component has an electrical component engagement feature;
a component cover that covers the electrical component, wherein the component cover has a first engagement feature that mates with the engagement feature in the housing wall to prevent rotation of the component cover relative to the housing wall and wherein the component cover has a second engagement features that mates with the electrical component engagement feature to prevent rotation of the electrical component relative to the component cover and relative to the housing wall.

27. The electronic device defined in claim 26 wherein the component cover has openings.

28. The electronic device defined in claim 27 wherein the electrical component engagement feature comprises a notch and wherein the second engagement feature comprises a protrusion that is received within the notch.

29. The electronic device defined in claim 27 wherein:
the housing wall is a curved housing wall;
the electrical component comprises a component selected from the group consisting of: a light source, a light detector, a speaker, and a sensor; and
the opening comprises a circular housing wall opening that is one of a plurality of circular housing wall openings in the curved housing wall.

* * * * *